(12) United States Patent
Birkestrand et al.

(10) Patent No.: US 8,135,795 B2
(45) Date of Patent: Mar. 13, 2012

(54) METHOD TO PROVIDE ON-DEMAND RESOURCE ACCESS

(75) Inventors: Daniel Charles Birkestrand, Rochester, MN (US); Randall Lane Grimm, Rochester, MN (US); David Otto Lewis, Rochester, MN (US); Terry Lyle Schardt, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 1217 days.

(21) Appl. No.: 10/406,652

(22) Filed: Apr. 3, 2003

(65) Prior Publication Data

US 2004/0236852 A1 Nov. 25, 2004

(51) Int. Cl.
G06F 15/16 (2006.01)

(52) U.S. Cl. ...................................... 709/208

(58) Field of Classification Search .................. 709/229, 709/223–226, 217–219, 208; 718/104
See application file for complete search history.

(56) References Cited

U.S. PATENT DOCUMENTS

| | | | |
|---|---|---|---|
| 5,579,222 A | 11/1996 | Bains et al. | |
| 5,604,528 A | 2/1997 | Edwards et al. | |
| 5,717,604 A | 2/1998 | Wiggins | |
| 5,745,879 A | 4/1998 | Wyman | |
| 5,754,879 A | 5/1998 | Johnston | |
| 5,889,952 A * | 3/1999 | Hunnicutt et al. ............ | 709/219 |
| 5,949,876 A | 9/1999 | Ginter et al. | |
| 5,953,515 A | 9/1999 | Coteus et al. | |
| 5,956,505 A | 9/1999 | Manduley | |
| 6,012,032 A | 1/2000 | Donovan et al. | |
| 6,058,423 A * | 5/2000 | Factor ........................... | 709/226 |
| 6,061,504 A | 5/2000 | Tzelnic et al. | |
| 6,061,732 A | 5/2000 | Korst et al. | |
| 6,081,892 A | 6/2000 | Lomas | |
| 6,086,618 A * | 7/2000 | Al-Hilali et al. .................. | 703/2 |
| 6,125,457 A | 9/2000 | Crisan et al. | |
| 6,134,659 A | 10/2000 | Sprong et al. | |
| 6,161,139 A | 12/2000 | Win et al. | |
| 6,230,200 B1 | 5/2001 | Forecast et al. | |
| 6,243,468 B1 | 6/2001 | Pearce et al. | |
| 6,282,112 B1* | 8/2001 | Couvee et al. .................. | 365/52 |

(Continued)

FOREIGN PATENT DOCUMENTS

JP 2002024192 A 1/1990

(Continued)

OTHER PUBLICATIONS iSeries Model 840 Manual, "V5R1 Planning Guide for Capacity Upgrade on Demand", Oct. 10, 2001, pp. 1-29.

(Continued)

Primary Examiner — Wing Chan
Assistant Examiner — Alicia Baturay
(74) Attorney, Agent, or Firm — Patterson & Sheridan LLP

(57) ABSTRACT

Method, apparatus and article of manufacture for on-demand access to computerized resources. A resource-time value includes a resource-identifying component and a usage limit component. The resource-identifying component specifies a given type of a resource and the usage limit component defines a maximum allowable usage value of the resource on the basis of time and quantity. Upon verifying the resource-time value, a quantity of the resource is enabled. The enabled resources may then be placed into service for specified time periods, wherein the quantity of resources placed into service and the time periods are delimited by the usage limit component.

22 Claims, 5 Drawing Sheets

U.S. PATENT DOCUMENTS

| | | | |
|---|---|---|---|
| 6,301,616 B1 * | 10/2001 | Pal et al. | 709/226 |
| 6,317,828 B1 | 11/2001 | Nunn | |
| 6,374,402 B1 | 4/2002 | Schmeidler et al. | |
| 6,385,651 B2 * | 5/2002 | Dancs et al. | 709/227 |
| 6,389,543 B1 | 5/2002 | Dawson et al. | |
| 6,460,082 B1 | 10/2002 | Lumelsky et al. | |
| 6,463,537 B1 | 10/2002 | Tello | |
| 6,578,199 B1 | 6/2003 | Tsou et al. | |
| 6,625,750 B1 | 9/2003 | Duso et al. | |
| 6,725,379 B1 | 4/2004 | Dailey | |
| 6,754,822 B1 | 6/2004 | Zhao | |
| 6,912,512 B2 | 6/2005 | Miyazaki et al. | |
| 6,931,640 B2 | 8/2005 | Asano et al. | |
| 6,970,948 B2 | 11/2005 | Brown et al. | |
| 6,975,204 B1 | 12/2005 | Silver | |
| 6,993,654 B2 | 1/2006 | Seki et al. | |
| 7,013,296 B1 | 3/2006 | Yemini et al. | |
| 7,017,188 B1 | 3/2006 | Schmeidler et al. | |
| 7,020,161 B1 * | 3/2006 | Eberle et al. | 370/468 |
| 7,020,704 B1 | 3/2006 | Lipscomb et al. | |
| 7,032,241 B1 | 4/2006 | Venkatachary et al. | |
| 7,039,784 B1 | 5/2006 | Chen et al. | |
| 7,051,366 B1 | 5/2006 | LaMacchia et al. | |
| 7,055,040 B2 | 5/2006 | Klemba et al. | |
| 7,065,504 B2 | 6/2006 | Sakuma et al. | |
| 7,073,073 B1 | 7/2006 | Nonaka et al. | |
| 7,085,967 B2 | 8/2006 | Elfering et al. | |
| 7,124,098 B2 | 10/2006 | Hopson et al. | |
| 7,136,800 B1 | 11/2006 | Vega | |
| 7,146,496 B2 | 12/2006 | Circenis et al. | |
| 7,149,311 B2 | 12/2006 | MacKenzie et al. | |
| 7,150,021 B1 * | 12/2006 | Vajjhala et al. | 718/104 |
| 7,155,735 B1 | 12/2006 | Ngo et al. | |
| 7,185,086 B2 | 2/2007 | Bodapati et al. | |
| 7,231,369 B2 | 6/2007 | Hirabayashi | |
| 7,269,160 B1 | 9/2007 | Friedman et al. | |
| 7,322,034 B2 | 1/2008 | Crawford, Jr. et al. | |
| 7,324,450 B2 | 1/2008 | Oliver | |
| 7,447,764 B2 * | 11/2008 | Guillemin | 709/224 |
| 7,493,488 B2 | 2/2009 | Lewis et al. | |
| 7,500,075 B1 * | 3/2009 | Garrett, Jr. | 711/167 |
| 7,818,792 B2 | 10/2010 | Shamsaasef et al. | |
| 2001/0025249 A1 | 9/2001 | Tokunaga | |
| 2001/0044782 A1 | 11/2001 | Hughes et al. | |
| 2002/0016842 A1 * | 2/2002 | Eki | 709/226 |
| 2002/0023181 A1 | 2/2002 | Brown et al. | |
| 2002/0056002 A1 * | 5/2002 | Charas | 709/226 |
| 2002/0072414 A1 * | 6/2002 | Stylinski et al. | 463/42 |
| 2002/0095573 A1 | 7/2002 | O'Brien | |
| 2002/0124168 A1 | 9/2002 | McCown et al. | |
| 2002/0149468 A1 | 10/2002 | Carrender et al. | |
| 2002/0156824 A1 | 10/2002 | Armstrong et al. | |
| 2002/0166117 A1 | 11/2002 | Abrams et al. | |
| 2002/0169725 A1 | 11/2002 | Eng | |
| 2002/0178387 A1 | 11/2002 | Theron | |
| 2002/0199182 A1 | 12/2002 | Whitehead | |
| 2003/0018870 A1 | 1/2003 | Abboud et al. | |
| 2003/0028653 A1 * | 2/2003 | New et al. | 709/229 |
| 2003/0033411 A1 * | 2/2003 | Kavoori et al. | 709/226 |
| 2003/0036918 A1 | 2/2003 | Pintsov | |
| 2003/0040962 A1 | 2/2003 | Lewis | |
| 2003/0093496 A1 * | 5/2003 | O'Connor et al. | 709/217 |
| 2003/0093528 A1 * | 5/2003 | Rolia | 709/226 |
| 2003/0135580 A1 | 7/2003 | Camble et al. | |
| 2003/0149880 A1 | 8/2003 | Shamsaasef et al. | |
| 2003/0172035 A1 | 9/2003 | Cronce et al. | |
| 2003/0191846 A1 * | 10/2003 | Hunnicutt et al. | 709/229 |
| 2003/0217011 A1 | 11/2003 | Peinado et al. | |
| 2003/0226029 A1 | 12/2003 | Porter et al. | |
| 2004/0010544 A1 | 1/2004 | Slater et al. | |
| 2004/0019789 A1 | 1/2004 | Buer | |
| 2004/0024688 A1 | 2/2004 | Bi et al. | |
| 2004/0054908 A1 | 3/2004 | Circenis et al. | |
| 2004/0064268 A1 | 4/2004 | Gillenwater et al. | |
| 2004/0073816 A1 | 4/2004 | Hansen | |
| 2004/0078454 A1 | 4/2004 | Abrahams et al. | |
| 2004/0088412 A1 | 5/2004 | John et al. | |
| 2004/0103064 A1 | 5/2004 | Howard et al. | |
| 2004/0107167 A1 | 6/2004 | Maari | |
| 2004/0111308 A1 | 6/2004 | Yakov | |
| 2004/0128507 A1 | 7/2004 | McKenney et al. | |
| 2004/0148394 A1 | 7/2004 | Circenis et al. | |
| 2004/0148511 A1 | 7/2004 | Circenis et al. | |
| 2004/0163019 A1 | 8/2004 | Elfering et al. | |
| 2004/0163135 A1 | 8/2004 | Giaccherini et al. | |
| 2004/0165211 A1 | 8/2004 | Herrmann et al. | |
| 2004/0181469 A1 * | 9/2004 | Saeki | 705/30 |
| 2004/0199473 A1 | 10/2004 | Birkestrand et al. | |
| 2004/0199632 A1 | 10/2004 | Romero et al. | |
| 2004/0215569 A1 | 10/2004 | Agha et al. | |
| 2004/0255048 A1 | 12/2004 | Lev Ran et al. | |
| 2004/0267944 A1 | 12/2004 | Britt | |
| 2005/0010502 A1 | 1/2005 | Birkestrand et al. | |
| 2005/0015343 A1 | 1/2005 | Nagai et al. | |
| 2005/0044219 A1 | 2/2005 | Lewis et al. | |
| 2005/0049973 A1 | 3/2005 | Read et al. | |
| 2005/0066032 A1 | 3/2005 | Birkestrand et al. | |
| 2005/0246705 A1 | 11/2005 | Etelson et al. | |
| 2005/0268063 A1 | 12/2005 | Diao et al. | |
| 2006/0100962 A1 | 5/2006 | Wooldridge et al. | |
| 2006/0190615 A1 | 8/2006 | Panwar et al. | |
| 2006/0294238 A1 | 12/2006 | Naik et al. | |
| 2009/0119508 A1 | 5/2009 | Lewis et al. | |

FOREIGN PATENT DOCUMENTS

| | | |
|---|---|---|
| TW | 439031 A4 | 6/2001 |
| WO | WO 02086698 | 10/2002 |

OTHER PUBLICATIONS iSeries Model 830 Manual, "V5R1 Planning Guide for Capacity Upgrade on Demand", Oct. 10, 2001, pp. 1-30.

IBM eServer iSeries 400 Presentation, "Capacity Upgrade on Demand", Oct. 3, 2000.

Friedmann, "Wie gut sind Capacity-on-Demand-Angebote?" Feb. 13, 2003, pp. 1-6.

Katharina Friedmann, "Wie gut sind Capacity-on-Demand-Angebote?", pp. 1-5, Feb. 13, 2003, printed on Feb. 1, 2007, available at http://www.computerwoche.de/produkte_technik/weitere_beitraege/536343/index.html.

A Case for Grid Computing on Virtual Machines, Fortes et al, May 2003.

Sugarman, Jeremy et al, "Virtualizing I/O Devices on VMware Workstation's Hosted Virtual Machine Monitor", Proceedings of the 2001 USENIX Annual Technical Conference.

Aner Gusic, "Design and implementation of recording functionality for an IP-based set-top box," Department of Computer & Information Science, Jan. 2005: pp. 1-82, Linkopings Universitet, <http://www.lysator.liu.se/~aner/thesis.pdf>.

\* cited by examiner

DISPLAY ON / OFF CAPACITY ON DEMAND

SYSTEM : S10258RM
09 / 23 / 02 ~406
16 : 07 : 43 ~404
336 ~408
77B43AC64A89AED ~402

NUMBER OF SYSTEM PROCESSORS............................................: 16
STANDBY PROCESSORS (CURRENTLY REQUESTED)..................: 4
STANDBY PROCESSORS (AVAILABLE FOR REQUEST)..................: 4
HISTORY OF REQUESTED PROCESSOR - DAYS...............................: 0
HISTORY OF UNRETURENED PROCESSOR - DAYS.............................: 0

SYSTEM TYPE AND SERIAL NUMBER.........................................: 9406   10-5TZ4M
CAPACITY CARD CCIN..............................................................: 2486
CAPACITY CARD SERIAL NUMBER...........................................: 10-8888888
CAPACITY CARD UNIQUE IDENTIFIER.......................................: D3C1C24040404040
ACTIVATION FEATURE..............................................................: 1610
SEQUENCE NUMBER.................................................................: 0020

| REQUESTED PROCS | --PROCESSOR -- DAYS -- EXPIRED | REMAINING | CALENDAR DAYS REMAINING | EXPIRATION DATE | ON / OFF COD COUNTER |
|---|---|---|---|---|---|
| 4 | 0 | 23 | 23 | 10 / 16 / 02 | 192 |

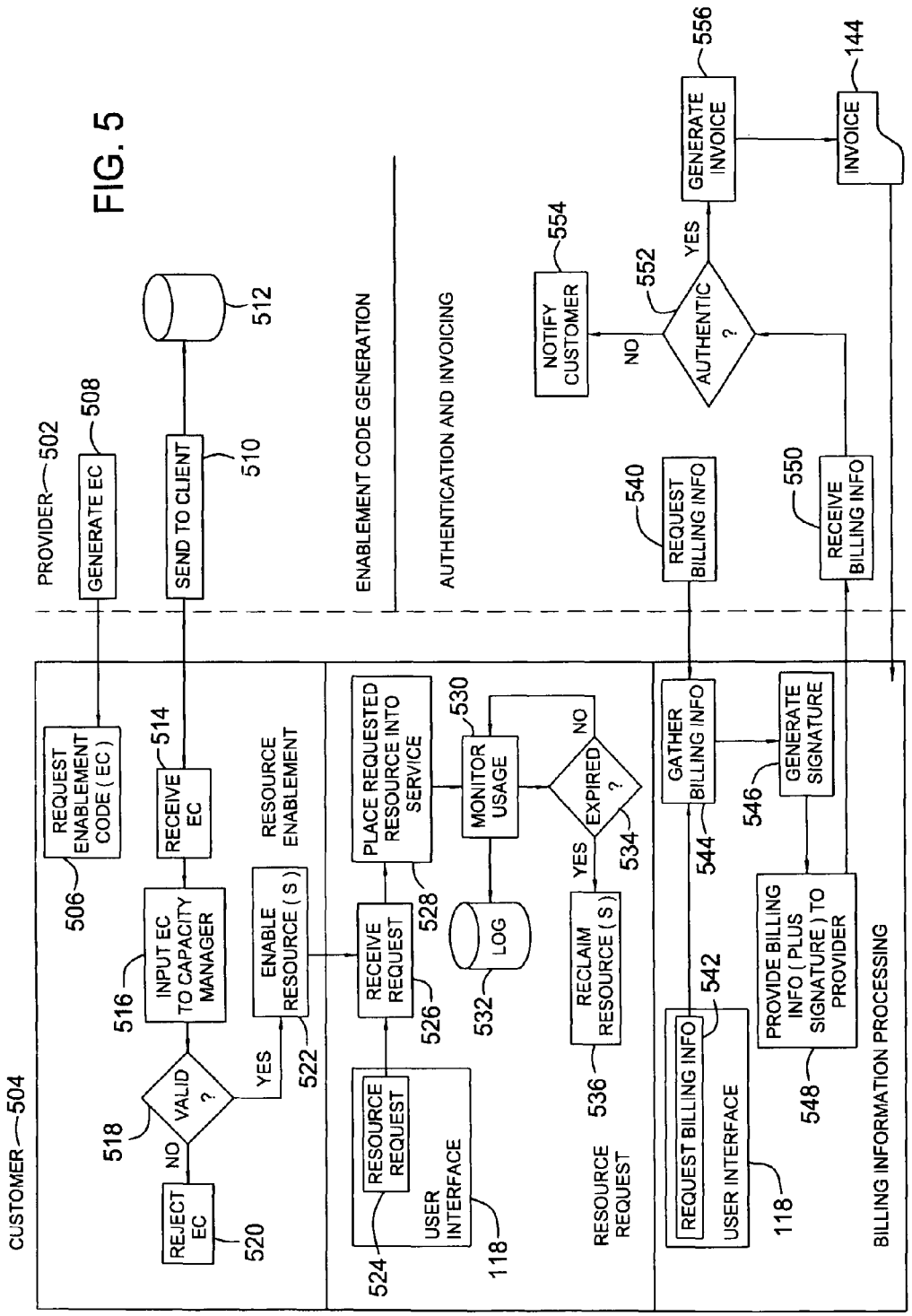

METHOD TO PROVIDE ON-DEMAND RESOURCE ACCESS

CROSS-REFERENCE TO RELATED APPLICATIONS

This application is related to co-pending and commonly owned U.S. patent application Ser. No. 10/406,164, "BILLING INFORMATION AUTHENTICATION FOR ON-DEMAND RESOURCES", filed on Apr. 3, 2006, and incorporated by reference in its entirety.

BACKGROUND OF THE INVENTION

1. Field of the Invention

The present invention generally relates to data processing and more particularly to the selective availability of hardware capacity on a computerized apparatus.

2. Description of the Related Art

The operation of a business is a dynamic undertaking. To increase profit margins, businesses continually seek out means of assessing and controlling costs. For example, one attractive alternative to outright purchases of assets is leasing. Leasing provides flexibility and, in some cases, tax advantages.

However, regardless of whether an asset is purchased or leased, some assets have periods of idleness, or decreased usage. During these periods, the assets are not productive, or not optimally productive, but still have associated costs which the business incurs. A particular asset that suffers from this problem is the computer.

Today's computers are powerful devices having significant capacity for functions such as processing and storage. Unfortunately, the cost of owning and operating computers can be significant for some businesses. In order to be effective, the computerized resources of a business must be sufficient to meet the current needs of the business, as well as projected needs due to growth. In addition, even assuming no growth, the resources must be capable of tolerating the business's inevitable peaks and valleys of day-to-day operations due to increased loads for seasonal, period end, or special promotions.

As a result, businesses are left in the position of having to invest in more computerized resources than are immediately needed in order to accommodate growth and operational peaks and valleys. In the event the growth exceeds the available computerized resources, the business must upgrade its resources, again allowing for projected growth. Thus, at any given time in its growth cycle, a business will have excess computer capacity allowing for growth as well as the peaks and valleys of short-term operations. This excess capacity translates into real cost for the business.

Therefore, there is a need for providing users with more flexibility in the use of computerized resources.

SUMMARY OF THE INVENTION

The present invention generally pertains to on-demand access to computerized resources.

In one embodiment, a resource-time value includes a resource-identifying component and a usage limit component. The resource-identifying component specifies a given type of a resource and the usage limit component defines a maximum allowable usage value of the resource on the basis of time and quantity. A quantity of the resource specified by the resource-identifying component is enabled. The enabled resources may then be placed into service for specified time periods, wherein the quantity of resources placed into service and the time periods are delimited by the usage limit component.

In one aspect, a computer-implemented method for enabling resources on a computerized apparatus is provided. The method includes receiving a resource-time value comprising a resource-identifying component and a usage limit component, wherein the resource-identifying component specifies a given type of a resource and the usage limit component defines a maximum allowable usage value of the resource; and enabling a quantity of the resource of the given type specified by the resource-identifying component based on the usage limit component.

In another aspect a computer-implemented method for enabling resources on a computerized apparatus includes receiving a resource-time value comprising a resource-identifying component and a usage limit component, wherein the resource-identifying component specifies a given type of a resource and the usage limit component defines a maximum allowable usage value of the resource on the basis of time and quantity; enabling the resource of the given type specified by the resource-identifying component; placing a specified quantity of the enabled resource into service for a specified time period, wherein the product of the quantity and the time period must be less than or equal to the maximum allowable usage value; and disabling the specified quantity of the enabled resource upon expiration of the time period.

In yet another aspect, a computer-implemented method for providing resource-enabling values includes generating a resource-time value having a resource-identifying component and a usage limit component, wherein the resource-identifying component specifies a given type of a resource of a computerized apparatus and the usage limit component defines a maximum allowable usage value of the resource on the basis of time and quantity.

Still another aspect provides a computer readable medium containing a program which, when executed, performs an operation, including receiving a resource-time value comprising a resource-identifying component and a usage limit component, wherein the resource-identifying component specifies a given type of a resource and the usage limit component defines a maximum allowable usage value of the resource on the basis of time and quantity; and enabling a quantity of the resource specified by the resource-identifying component for a time period, wherein the quantity and the time period are delimited by the usage limit component.

Still another aspect provides a computerized apparatus including a plurality of resources including hardware and software and a capacity manager. The capacity manager is configured to at least: (i) receive a resource-time value comprising a resource-identifying component and a usage limit component, wherein the resource-identifying component specifies a given type of a resource and the usage limit component defines a maximum allowable usage value of the resource on the basis of time and quantity; (ii) enable the resource specified by the resource-identifying component; (iii) place a specified quantity of the enabled resource into service for a specified time period, wherein the product of the quantity and the time period must be less than or equal to the maximum allowable usage value; and (iv) disable the specified quantity of the enabled resource upon expiration of the time period.

Still another aspect of a computer-implemented method for enabling resources on a computerized apparatus includes receiving an enablement code; verifying the enablement code; and in response to verifying the enablement code, enabling a quantity of the resources with a time restriction on use.

Still another aspect provides a computer-implemented method for allowing enablement of resources on a computer. The method includes generating an enablement code configured to enable the resources on the computer and make the resources available for use for a limited period of time upon request; and sending the enablement code to a user of the computerized apparatus.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a screen of a user interface populated with billing information and an encrypted signature used to verify the authenticity of the billing information.

FIG. 5 is a flow chart illustrating the operation of one embodiment of the invention implemented in the context of a provider and customers of the provider.

DETAILED DESCRIPTION OF THE PREFERRED EMBODIMENTS

Figure 1:
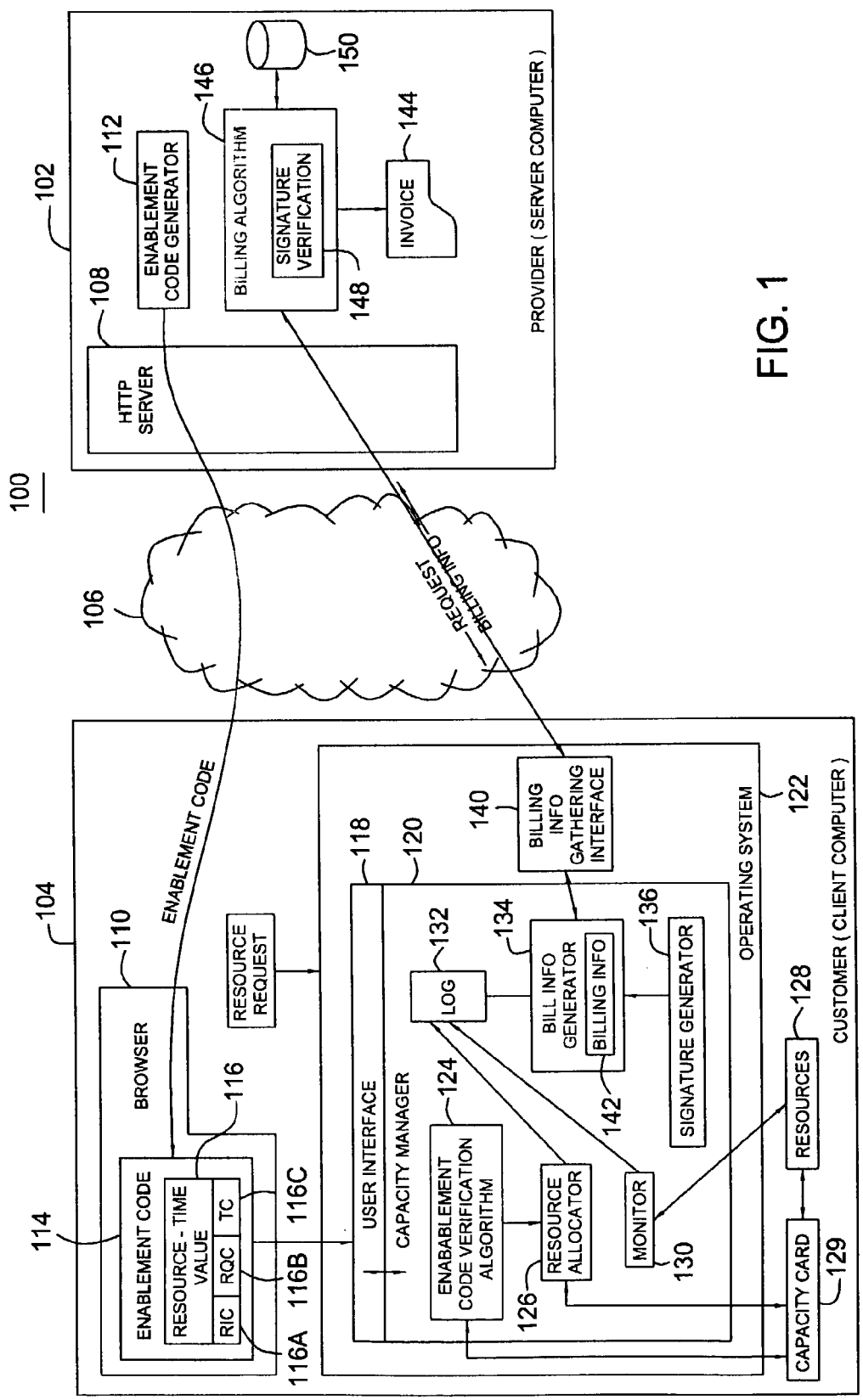
FIG. 1 is a block diagram of an environment having a provider of enablement codes providing such codes to users (e.g., customers)

The present invention generally pertains to on-demand access to computerized resources (also referred to herein as On/Off Capacity on Demand, or On/Off CoD). Computerized resources are made available on demand in response to actual needs, rather than projected needs. In one aspect, the provision of such flexibility provides a cost efficient solution to accommodate peaks and valleys that occur in any business. Increased loads for seasonal, period end, or special promotions, for example, can be responded to quickly and efficiently. A customer pays for the capacity/resources that it needs, when it is needed. As a result, the cost of computerized resources substantially matches the computerized resources actually being used, and does not include a substantial premium for excess capacity not being used. Of course, in practice, providers may attach some form of a premium to the flexibility provided by on demand resource access. However, even with such a premium, some users will realize a savings.

It should be noted that while aspects of the invention are described in the context of a business, the invention provides advantages to any user, whether involved in a business or not.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Referring now to FIG. 1, a data processing environment 100 shown. Generally, the environment includes a provider computer 102 and a customer computer 104. The provider computer 102 is illustratively embodied as a server computer with respect to the customer computer 104, which is therefore embodied as a client computer. Although both are shown as singular entities, in practice the provider computer 102 and the client computer 104 may each be a network of computers configured to perform various functions described herein. Therefore, it is understood that although only one client computer is shown, a plurality of client computers may be configured according to aspects of the invention and, in some cases, be serviced by the provider computer 102 and/or the customer computer 104. Further, the terms "client" and "server" are used merely for convenience and not by way of limitation. As such, the customer computer 104, which may be a client relative to the provider computer 102 in some regards, may itself be a server relative to one or more other clients (not shown).

The provider computer 102 and the customer computer 104 communicate through a network 106. Illustratively, the network 106 may be any medium through which information may be transferred such as, for example, a local area network (LAN) and a wide area network (WAN). The network 106 is merely representative of one communications medium. Some aspects of the invention may be facilitated by other communication mediums such as, for example, the U.S. Postal Service. Still other aspects may be practiced in the absence of any communication medium between the provider 102 and the customer 104.

In a particular embodiment, the network 106 is the Internet. As such, the provider computer 102 may be configured with a hypertext transfer protocol (HTTP) server 108 capable of servicing requests from a browser program 110 residing on the customer computer 104. The HTTP server 108 and the browser program 110 provide convenient and well-known software components for establishing a network connection (e.g., a TCP/IP connection) via the network 106, and for receiving information from users on the computer systems 102, 104.

In one embodiment, the provider computer 102 is configured with an enablement code generator 112 (also referred to herein as the code generator 112). The code generator 112 in this embodiment is an algorithm capable of generating an enablement code 114. The code generator 112 may be invoked by a request received from the customer computer 104 via the network 106. In response to a request, the code generator 112 generates the code 114, which may be returned to the customer computer 104 via the same network connection. Alternatively, the code 114 may be returned via a different network connection, e.g., a subsequent network connection or an altogether different network. In a particular embodiment, the enablement code 114 is transmitted electronically to a client mail application (e.g., Lotus Notes® or Microsoft Outlook®; not shown) residing on the customer computer 104. Lotus Notes is a registered trademark of International Business Machines, Inc., and Microsoft Outlook is a registered trademark of Microsoft, Inc. In yet another alternative, the enablement code 114 is provided to the user (e.g., administrator) of the customer computer 104 via paper mail (i.e., the postal service) or facsimile, for example.

Regardless of the particular medium, the enablement code 114 in this embodiment is unique and configured for use only on a particular machine (e.g., the customer computer 104). The code 114 includes a particular value referred to herein as a resource-time value 116. The resource-time value 116 generally provides information capable of identifying a resource and how much of that resources available for use. In one embodiment, the resource-time value 116 generally identifies a resource, a quantity of the resource and a corresponding unit of time. As such, the resource-time value 116 shown in FIG. 1 is configured with a resource-identifying component ("RIC") 116A, a resource quantity component ("RQC") 116B and a time component ("TC") 116B. The resource-identifying component 116A specifies a resource type and resource quantity component 116B specifies a quantity of the resource. The time component 116C may specify a time period for which the resource is enabled. It should be noted that where on-demand capacity is available only for one type of resource, the resource-time value 116 may not require a resource-identifying component 116A. Similarly, where on-demand capacity is available for a unique resource (e.g., a central processing unit in a single processor machine), the resource-time value 116 may not require a resource-quantity component 116B.

As a particular example, a resource-time value 116 specifies a number of processors (in the resource quantity component 116B) and a time period (in the time component 116C) for which the processors may be used. Where the time period is given in days (a day being a 24 hour period), for example, the product of these values is a number of processors-days. Accordingly, "N processors-days" equals $N_P * N_D$, where $N_P$ is a number of processors and $N_D$ is a number of days. More generally, the resource component of a resource-time value may be any resource (e.g., of the customer computer 104) capable of being made selectively available according to request. Such resources include hardware such as, for example, memory and storage. The resource is may also include software, such as applications and databases. Yet another resource capable of being made selectively available is interactive capability (i.e., the number of users permitted access on the system). In addition, the quantity of the resource specified by the enablement code may be a whole number or a fraction. For example, in the case of processors, $N_P$ may be an integer value or a fractional value such as 0.25, where 0.25 may be quantified by CPU cycles. Other resources may be similarly quantified.

It is contemplated that the resource-time value 116 need not explicitly include a quantity of resources and a time value. Rather, the resource-time value 116 may include only the resource-identifying component 116A and a unit-less usage limit value. Alternatively, such a usage limit value may be the product of the resource quantity component 116B and the time component 116C. These aspects of the resource-time value 116 will be described more detail below.

The resource-time value 116 may be input to a capacity manager 120 via a user interface 118. Alternatively, the resource-time value 116 is input directly by provider computer 102 via a communication link (e.g., a network or modem connection). In still another embodiment, the resource-time value 116 is input to the capacity manager 120 via an application or some other program or routine.

In one embodiment, the capacity manager 120 is the Capacity on Demand function provided on machines from International Business Machines, Inc. One such machine is the eServer iSeries® computer. By way of illustration only, the capacity manager and user interface 118 are shown as components of an operating system 122. Examples of the operating system 122 include IBM OS/400®, AIX®, UNIX, Microsoft Windows®, and the like. However, the illustrated representation is merely one example of a particular software architecture, and not limiting of the invention. OS/400® and AIX®, are registered trademarks of International Business Machines, Inc., and Microsoft Windows® is a registered trademark of Microsoft, Inc.

In one embodiment, an enablement code verification algorithm 124 is invoked to verify the input enablement code 114. As noted above, the enablement code 114 is preferably specific to a particular machine. Accordingly, the verification algorithm 124 determines whether the enablement code 114 is configured for the particular machine for which the capacity manager 120 has responsibility and controls resource access. In this regard, it is contemplated that the capacity manager 120 may have resource access responsibility for a plurality of computers (i.e., a network). More typically, however, the capacity manager 120 manages only the resources of the machine on which it resides. In this case, the verification algorithm 124 determines whether the enablement code 114 is configured for the particular machine on which the capacity manager 120 resides.

If the enablement code 114 is verified, the capacity manager 120 then enables selected resources 128, e.g., hardware, according to the resource-time value 116. In particular, a resource allocator 126 (a function of the capacity manager 120) is invoked to enable, or "unlock", the selected resources. Enabling the resources 128 may be implemented by the provision of capacity-on-demand hardware. Illustratively, such hardware is represented as one or more capacity-on-demand cards 129. Each card 129 may be specific to a particular hardware type, e.g., processors, memory, etc. Alternatively, a single card may be used to enable multiple resource types. In one aspect, the capacity-on-demand cards 129 are used to store capacity-on-demand information in a secure (i.e., not accessible by the user) and nonvolatile manner. In one embodiment, the information stored in the capacity-on-demand cards 129 includes resource usage information and billing information (which will be described more detail below). As such, the card provides a master copy of such information that may be used to recover from a power failure situation or other catastrophic failure. The cards 129 may also be used to validate enablement codes and, as such, may cooperate with the enablement code verification algorithm 124.

In one embodiment, "enabling" or "unlocking" resources by the resource allocator 126 operates to place the resources into service (i.e., to perform their designated functions such processing or storing, depending upon the resource). In particular, the resource allocator 126 places a quantity of the resources into service for a period of time, as defined by the respective components of the resource-time value 116 (i.e., the resource-identifying component 116A, the resource quantity component 116B and the time component 116C).

In another embodiment, enabling the resources does not place the resources into service, but merely makes the resources available for request by a user. That is, enabling the resources unlocks the resources so that a user can assign into a task, but does not automatically give control of the resources to the operating system(s) on the computer. In this respect, it is contemplated that the user may be given flexibility in the manner in which the resource-time value 116 is used. For example, the resource-time value may define a usage limit which may be reached by specifying any variety of resource quantity values and time values, so long as the sum of the products of the specified quantity values and time values does not exceed the usage limit. In this regard, the user interface 118 may provide a field for specification of a quantity of resources (e.g., number of processors) and a field for specification of a period of time, where the product of the specified values must be less than or equal to the resource-time value. In this way, multiple resource requests may be made for capacity based on a single enablement code so long as the sum of the products of the specified quantity values and time values is equal to or less than the usage limit value specified by the resource-time value of a particular enablement code. Again, the usage limit value may be an explicit singular value specified in the resource-time value or may be the product of the resource quantity component 116B and time component 116A. As an example, assume that the usage limit specified in a particular enablement code is 16. A first request may specify usage of one processor for eight days, the product of which is eight (1(processor)*8(days)=8). At this point, additional resource requests may be made because the total usage value (i.e., 8) is less than the resource-time value of 16. Accordingly, a second request may specify usage of eight processors for one day, the product of which is eight (8(processors)*1 (days)=8). The sum of the products totals 16(8(first request)+8(second request)=16), which is the value of the resource-time value and, as such, no additional usage for the given enablement code is available for request. The usage value may then be decremented according to usage, but the requestor (e.g., user) is given the flexibility in determining precisely how the usage value will be consumed by assigning appropriate weights to the quantity of resources and the duration of time for which the resources are used.

It should be clear that regardless of the manner in which resources are placed into service, the duration for which the resources are in use (or at least available to be used if needed during continued operation of the system) is predefined according to a specified time limit (e.g., a time limit specified by a user or the time specified by the time component 116B of the resource-time value 116). Once the specified time limit expires, the enabled resources are reclaimed (e.g., by the resource allocator 126), and thereby disabled from further use. Of course, the same resources may again be enabled with another resource-time value 116. Aspects of the reclamation will be described in more detail below.

It is also contemplated that the resource-time value 116 may implicitly be defined for a given number of resource-time units, e.g., for 100 processor-days. In this case, the enablement code 114 need not explicitly include the resource-time value 116. Rather, the resource-time value is predefined on the computerized apparatus. Once the machine-specific enablement code 114 is entered, the computerized apparatus is enabled for the predefined resource-time value. Alternatively, either the resource quantity component 116B or the time component 116C may be defined on the computerized apparatus, and the other component is then provided with the enablement code 114. For example, the computerized apparatus may be configured with a resource quantity value of 5 processors, while an enablement code 114 includes a time component 114C having a value of 100.

Generally, the resources enabled according the enablement code 114 (e.g., as specified by the resource-identifying component 116A of the resource-time value 116) may be any variety of resources in a computerized apparatus. Such apparatus include any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. A computer may include any electronic device having at least one processor, and may be a standalone device or part of a network.

Figure 2:
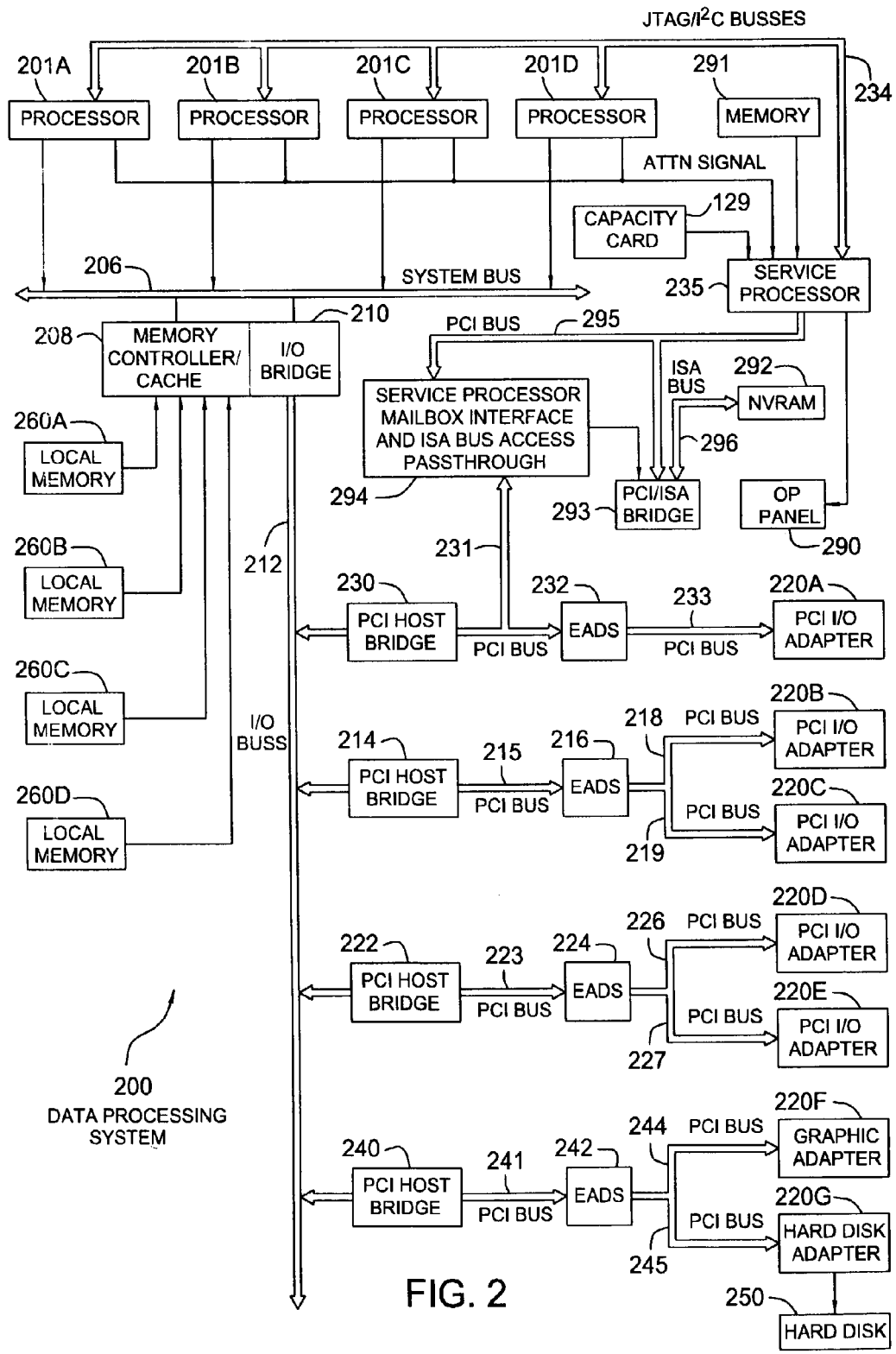
FIG. 2 is a block diagram of a computerized apparatus having resources capable of being enabled for use according to a resource-time value.

Referring now to FIG. 2, an illustrative data processing system 200 is shown which depicts various resources that may be enabled according the resource-time value 116 of the present invention. Accordingly, the data processing system 200 may be considered one embodiment of the client computer 104.

Illustratively, the data processing system 200 is a standalone system in that no other computers are connected to the system 200 by a network connection (e.g., a local area network or a wide area network). However, it is understood that the invention may be practiced in a distributed computing environment in which tasks are performed by remote processing devices that are linked through a communications network. In a distributed computing environment, program modules may be located in both local and remote memory storage devices.

In any case, it is understood that FIG. 2 is merely one configuration for a data processing system. Embodiments of the invention can apply to any comparable configuration, regardless of whether the system 200 is a complicated multi-user apparatus, a single-user workstation, or a network appliance that does not have non-volatile storage of its own.

Illustratively, data processing system 200 is a symmetric multiprocessor (SMP) system including a plurality of processors 201A-D connected to system bus 206. In a particular embodiment, data processing system 200 may be an eServer iSeries computer, a product of International Business Machines Corporation in Armonk, N.Y., implemented as a server within a network. Although shown as a SMP system, a single processor system may alternatively be employed. Also connected to system bus 206 is memory controller/cache 208, which provides an interface to a plurality of local memories 260A-D. I/O bus bridge 210 is connected to system bus 206 and provides an interface to I/O bus 212. Memory controller/cache 208 and I/O bus bridge 210 may be integrated as depicted.

The data processing system is a Peripheral Component Interconnect (PCI) bus implementation which supports a plurality of Input/Output adapters. Typical PCI bus implementations will support between four and eight I/O adapters (i.e.

expansion slots for add-in connectors). Illustratively, the processing system 200 includes seven (7) I/O adapters 220A-G. Each I/O Adapter 220A-G provides an interface between data processing system 200 and input/output devices such as, for example, other network computers, which are clients to data processing system 200. By way of example, a PCI Host bridge 214 connected to I/O bus 212 provides an interface to PCI local bus 215. A number (two shown) of I/O adapters 220B-C may be connected to PCI bus 215 via EADS 216 and respective PCI buses 218 and 219. Other I/O adapters may be similarly connected by respective PCI host bridges (e.g., bridges 222, 230 and 240), EADS (e.g., EADS 224, 232, and 242) and PCI buses (e.g., 223, 226-227, 231, 233, 241 and 244-245).

As examples of particular types of adapters, the system 200 includes a memory mapped graphics adapter 220F, which may be connected to I/O bus 212 through the PCI Host Bridge 240 and EADS 242 via PCI buses 241 and 244 as depicted. Also, a hard disk 250 may be connected to I/O bus 212 through PCI Host Bridge 240 and EADS 242 via PCI buses 241 and 245, and a hard disk adaptor 220G as depicted.

The PCI host bridge 230 provides an interface for a PCI bus 231 to connect to I/O bus 212. PCI bus 231 connects PCI host bridge 230 to the service processor mailbox interface and ISA bus access passthrough logic 294 and EADS 232. The ISA bus access passthrough logic 294 forwards PCI accesses destined to the PCI/ISA bridge 293, which also connects to NV-RAM storage 292 via an ISA bus 296. A Service processor 235 is coupled to the service processor mailbox interface 294 through its local PCI bus 295. The service processor 235 is also connected to processors 201A-D via a plurality of JTAG/$I^{2C}$ buses 234. JTAG/$I^{2C}$ buses 234 are a combination of JTAG/scan busses (see IEEE 1149.1) and Phillips $I^{2C}$ buses. However, alternatively, JTAG/$I^{2C}$ buses 234 may be replaced by only Phillips $I^{2C}$ busses or only JTAG/scan busses. All SP-ATTN signals of the host processors 201A-D are connected together to an interrupt input signal of the service processor 235, where the interrupt signal is the ATTN Signal line. The service processor 235 has its own local memory 291, and has access to the hardware op-panel 290. In addition, the service processor is connected to the smart card 129.

When data processing system 200 is initially powered up, service processor 235 uses the JTAG/scan buses 234 to interrogate the system (Host) processors 201A-D, memory controller 208, and I/O bridge 210. At completion of this step, service processor 235 has an inventory and topology understanding of data processing system 200. Service processor 235 also executes Built-In-Self-Tests (BISTs), Basic Assurance Tests (BATs), and memory tests on all elements found by interrogating the system processors 201A-D, memory controller 208, and I/O bridge 210. Any error information for failures detected during the BISTs, BATs, and memory tests are gathered and reported by service processor 235.

If a meaningful/valid configuration of system resources is still possible after taking out the elements found to be faulty during the BISTs, BATs, and memory tests, then the resource allocator 126 communicates with the capacity card(s) 129 to establish a secure session and determine the state of the system 200 before allowing the system 200 to boot. Determining the state of the system includes determining the number of resources requested, the history of previous requests for On/Off capacity, the amount of On/Off capacity remaining, etc. The data processing system 200 is allowed to proceed to load executable code into local (Host) memories 260A-D according to the determined state. Service processor 235 then releases the Host processors 201A-D for execution of the code loaded into Host memory 260A-D, also according to the determined state. The service processor 235 may also perform monitoring functions, such as checking for, and reporting, errors in the data processing system 200.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

In one embodiment, the client computer 104 (FIG. 1) is logically partitioned. A logical partition is logical separation of resources on a system, where each separate group of resources is under the control of a separate operating system. Illustratively, the resource allocator 126 is responsible for managing the logical partitions. In a particular embodiment, the resource allocator 126 is implemented as a "Hypervisor", a software component available from International Business Machines, Inc. of Armonk, N.Y. Using the data processing system 200 as an example of the client computer 104, the system 200 may have multiple heterogeneous operating systems (or multiple instances of a single operating system) running simultaneously. Each of these multiple operating systems may have any number of software programs executing within in it. When logically partitioned, different hardware resources, such as processors 201A-D, memories 260A-D, I/O adapters 220A-E, and fractions thereof, may be assigned to different logical partitions.

Thus, for example, suppose data processing system 200 is divided into three logical partitions, P1, P2, and P3. Each of I/O adapters 220A-E, each of the processors 201A-D, each of the local memories 260A-D may be assigned to one of the three partitions. For example, processor 201A, memory 260A, and I/O adapters 220B, 220D, and 220E may be assigned to logical partition P1; processors 201B-C, memory 260B, and I/O adapters 220C and 220A may be assigned to partition P2; and processor 201D, memories 260C-D, and I/O adapters 220F-G may be assigned to logical partition P3.

Each operating system executing within data processing system 200 is assigned to a different logical partition. Thus, each operating system executing within data processing system 200 may access only those I/O units that are within its logical partition. Thus, for example, one instance of the Advanced Interactive Executive (AIX®) operating system may be executing within partition P1, a second instance (image) of the AIX operating system may be executing within partition P2, and a Windows 2000 operating system may be operating within logical partition P3. Windows 2000 is a product and trademark of Microsoft Corporation of Redmond, Wash.

Figure 3:
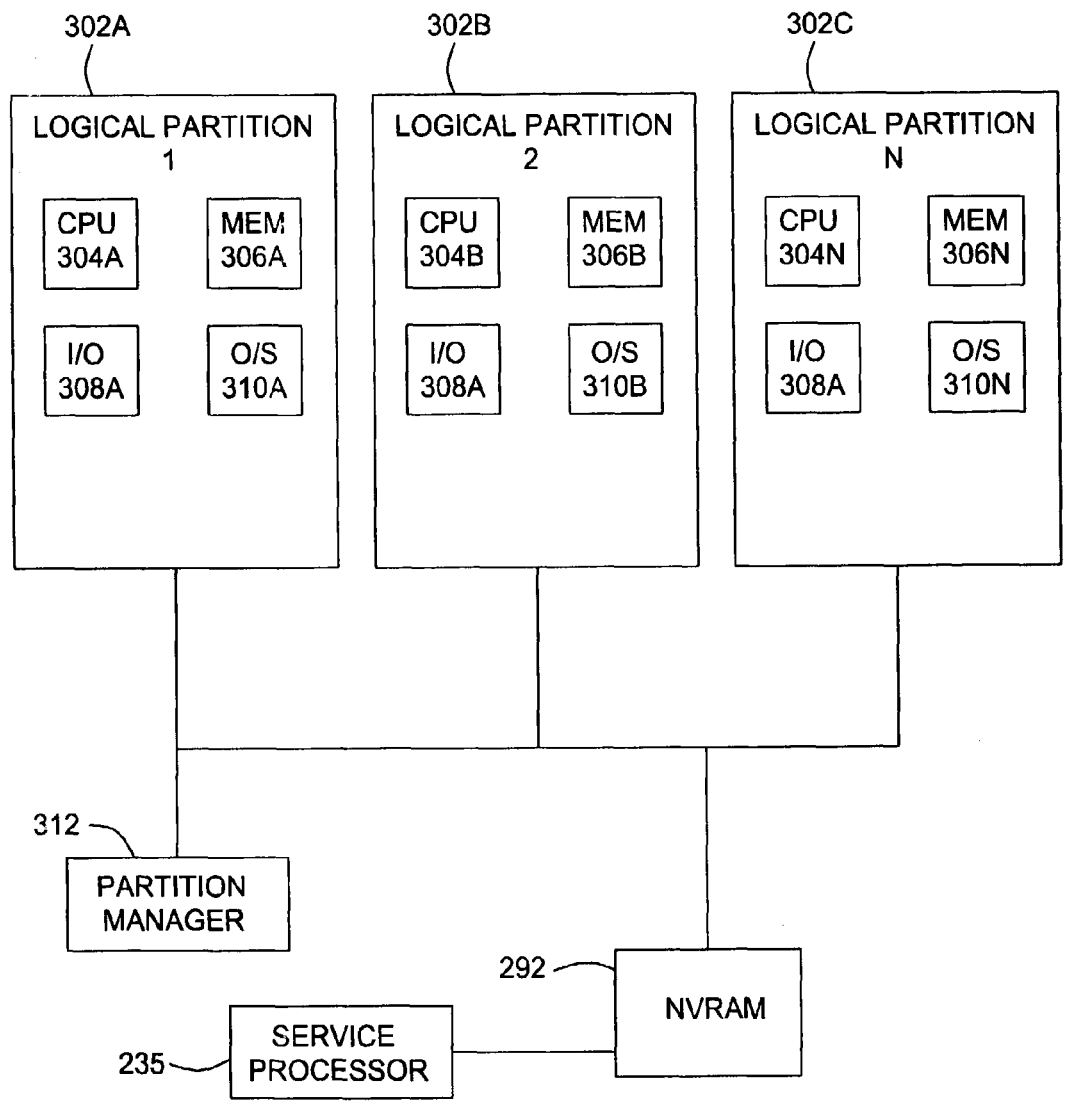
FIG. 3 is a block diagram of a logically partitioned computerized apparatus.

Referring now to FIG. 3, one representation of a logically partitioned system 300 is shown, and may be representative of the data processing system 200 which, in turn, may be representative of the client computer 104.

The system 300 includes multiple logical partitions 302A, 302B . . . 302N (collectively, logical partitions 302). In a particular embodiment, the system 104 may have up to sixty-two logical partitions 302; however, the particular capacity for logical partitions is not limiting of the invention. The logical partitions are managed by a partition manager 312. Each logical partition 302 has processor(s) 304A, 304B, . . . 304N, memory 306A, 306B, . . . 306N, and I/O devices 308A, 308B, . . . 308N, and may run its own operating system 310A, 310B, . . . 310N independently of the other logical partitions 302. The resources associated with the various partitions 302 may be physical or logical/virtual. A virtual resource represents the capacity of a logical partition to use a resource, where the capacity is made available by one or more resources not exclusively under the control of the partition. A virtual processor, for example, corresponds to processing capability provided by one or more physical processors. Where virtual processors are implemented, the logical partitions do not have exclusive ownership over specific physical processors. Rather, the physical processors may be shared amongst the various logical partitions, and are available to the logical partitions according to the virtual processors defined for the respective logical partitions.

In one embodiment, the system 300 may operate in single machine partition (SMP) mode or in a logically partitioned (LPAR) mode. In a particular embodiment, a user of the system 300 may first be required to specify a primary partition before being allowed to enable resources using the enablement code 116 (FIG. 1). A primary partition is one in which the resource allocator 126 runs. Secondary partitions rely on the primary partition for services such as resource allocation, communication between partitions and other services. In another embodiment, primary and secondary partitions are not needed.

Billing Information Generation and Verification

Reference is now made again to FIG. 1 to describe one embodiment in which the capacity manager 120 is configured to generate billing information. In general, the billing information may be generated periodically according to a predefined schedule, or on demand. In any case, generation of billing information may be facilitated by the provision of a log 132. In one embodiment, both the resource allocator 126 and a resource monitor 130 write to the log 132. For example, the resource allocator 126 may write information including which resources are enabled and the corresponding time value for the enabled resources. The resource monitor 130 may record resource usage information such requested time expired for a resource, requested time remaining for a resource, total runtime hours for a each enabled resource, the identity of the process or administrator that requested the On/Off capacity, and various enabled resource-specific metrics such as CPU cycles used, bytes of memory used, event timestamps, etc. In one embodiment, this information is also written to the capacity card 129 for backup.

Information contained in the log 132 is retrieved by a billing information generator 134. The billing information generator 134 may also retrieve or receive information from other sources. For example, the billing information generator 134 may retrieve a current timestamp and date stamp. In one embodiment, the billing information generator 134 invokes a signature generator 136. The signature generator 136 may be any algorithm (embodied in hardware, software or combination thereof) capable of producing an encrypted signature. Particular examples of encryption technology that may be used include checksums, Digital Signature Standard (Federal Information Processing Standard 186-2), Eliptic Curve Crypto systems (ECC) and Data Encryption Standard-Method Authentication Code (DEC-MAC) and any other technology, known or unknown. In a particular embodiment, the signature generator 136 uses as input a variety of billing information provided by the billing information generator 134. Such input may include the contents of the log 132, for example. The particular algorithm or input used by the signature generator 136 is not limiting of the invention, so long as the output produced may be used by the provider to verify the authenticity of selected essential items of the billing information.

Generally, the billing information generator 134 may be accessed locally (e.g., by a user of the customer machine 104) or remotely (e.g., by the provider computer 102). Remote access may be facilitated, for example, by a TCP/IP connection initiated from the provider computer 102. In one embodiment, a remote access request is received by a billing information gathering interface 140. The gathering interface 140 includes a function for requesting billing information 142 from the billing information generator 134. Once invoked by the gathering interface 140, the billing information generator 134 may take the steps described above to compile the requested billing information 142. In addition, the billing information generator 134 may format the information 142. The billing information 142 is then provided to the billing information gathering interface 140 which, in turn, returns the billing information 142 to the provider computer 102.

Alternatively or additionally, a user may invoke the billing information generator 134 via the user interface 118. FIG. 4 shows an illustrative screen 400 of the user interface 118. Illustratively, the fields of the screen 400 are specific to a resource-time value in which the resource is processor and the time is days. In such an embodiment, the resource-time value is referred to as a processor-day value. Of course, similar screens may be provided for any resource and unit of time. Generally, the screen 400 includes all the billing information 142 generated by the billing information generator 134.

The screen 400 (or more particularly, its content) may then be provided to the provider 102 via, for example, facsimile, email, or regular mail. Transmission mediums such as these may be preferred by customers uncomfortable with the perceived intrusion of a provider requesting access to the billing information 142 via the billing information gathering interface 140. However, where such transmission mediums are used by the customer, some assurance of authenticity of the billing information is needed for the provider 102. As such, the signature generator 136 provides one means of ensuring authenticity. As noted above, the signature generator 136 may produce a signature using all or a portion of the billing information 142. The signature may then be included as a field on the screen 400, a copy of which is provided to the provider computer 102. The screen 400 of FIG. 4 shows one illustrative representation of such a signature 402. By way of illustration only, the signature 402 shown as a string of alphanumeric characters. More generally, any other representation of the signature 402 may be employed. For example, the signature 402 may be embodied as a bar code.

Various fields which are, or may be, used by the signature generator 136 to generate the signature 402 contained in screen 400 are shown in the Table below, and are now described in more detail. While the screen 400 is specific to processor-days, the Table is intended to be generic to any resource and any unit of time.

| TABLE | |
|---|---|
| BASIC INFORMATION | System type (*) |
| | System serial number (*) |
| | Capacity card CCIN (*) |
| | Capacity card serial number (*) |
| | Capacity card unique identifier (*) |
| RESOURCE INFORMATION | Activation feature (*) |
| | Sequence number (*) |
| | Total System Resources |
| | Resources currently requested (*) |
| | Standby resources available for request (*) |
| | Time currently requested |
| | Requested resource-time expired |
| | Requested resource-time remaining |
| | Calendar Days Remaining |
| | Expiration Date |
| | Enablement counter (On/Off CoD) |
| | History of requested resource-time (*) |
| | History of unreturned resource-time (*) |
| DATA ACCURACY MEASUREMENTS | Current date/time (*) |
| | System runtime (*) |
| | Signature check (*) |

Generally, the fields may be categorized as Basic Information, Resource Information and Data Accuracy Measurements. The Basic Information fields describe aspects of a system, generally. In one embodiment, the System Type and Serial Number together provide unique system identification. The remaining fields of the Basic Information describe aspects of the capacity card (described above with respect to FIGS. 1 and 2). In particular, a capacity card identification number and capacity card serial number are provided. In one embodiment, a capacity card unique identifier may also be included.

The Resource Information generally characterizes specific aspects of the resource-on-demand feature of the present invention as implemented for the given system. The Activation Feature is a number used to identify the customer order to the provider. In the example shown in the screen 400, the value "1610" indicates a request for processors. The Sequence Number is a counter value which increments for each enablement code entered into the system. The Total System Resources ("Number of System Processors" in the screen 400) field indicates the total number of a given resource (e.g., processors) on the system. It is contemplated that all or a portion of the available resources may be enabled and requested for use. The Resources Currently Requested field indicates the amount of resources (e.g., number of processors) temporality in use (i.e., enabled and requested) by the system. The Standby Resources Available for Request field indicates the quantity of resources of a given type (e.g., number of processors) not currently in use. Time Currently Requested and Resources Currently Requested indicate the amount of time (e.g., days) and number of a given resource, respectively, specified within a given On/Off capacity-on-demand (CoD) request. In the screen 400, illustrative values for these fields are four (4) and twenty-three (23), respectively. Note that in the screen 400 the Resources Currently Requested value is provided in two fields, once in the second billing information field named "Standby Processors (Currently Requested)" and once at the bottom of the screen in the first column ("Requested") of a summary section. The Requested Resource-Time Expired field shows the number of resource-time units that have been used for a given On/Off CoD request, while the Requested Resource-Time Remaining field shows the remaining time for the given On/Off CoD request. In the screen 400, illustrative values for these fields are zero (0) and ninety-two (92), respectively, where the value of ninety-two is the product of the requested resource and the time values. A Calendar Days Remaining field shows the time remaining (e.g., number of days) for the current On/Off CoD request. This value may be based on the system date and time (a representative time stamp 404 and date stamp 406 are shown in the upper right-hand corner of the screen 400 in FIG. 4.) In the screen 400, an illustrative value for this field is twenty-three (23). Based on the current date and the Calendar Days Remaining field, a value for the Expiration Date field may be calculated. In the example provided by the screen 400 in FIG. 4, the Expiration Date is Oct. 16, 2002, based on the current date of Sep. 23, 2002 (the date stamp 406) and a value for the Calendar Days Remaining field of twenty-three (23). The Enablement Counter value shows the total number of resource-time units left for use by the system. This value is calculated by subtracting the History of Requested Resource-Time units from the number of Resource-Time units allowed when the enablement code was entered, where the History of Requested Resource-Time field indicates the number of resource-time units used so far by the system. Finally, the History of Unreturned Resource-Time field shows the number of resource-time units the system was unable to recover past the allowed usage. In other words, it is contemplated that even when usage exceeds the allowed limit (as defined by the usage limit of the resource-time value 116), the resources may continue to be used, but such usage is monitored and logged.

The remaining fields of the Table may be referred to as Data Accuracy Measurements fields. Such fields may include time and date stamps, a system runtime value and the generated signature. Illustrative representations for each of these fields are shown in the screen 400 of FIG. 4 and are identified by reference numerals 404, 406, 408 and 402, respectively. The system runtime counter 408 is a history of system runtime hours, i.e., the number of hours the system has been powered on and functional since an enablement code was entered. The runtime counter 408 is a continually increasing value, and provides a means to determine whether the billing information is "old" or suspicious (e.g., insufficiently incremented over an extended period of time). The runtime counter 408 may be a necessary value for billing information authentication, since users can alter system the date and time. Another field which may be included with the billing information (but which is not shown in the screen 400 of FIG. 4) is a status field. The status field may be, for example, a two character indicator of a detected problem and provides a quick visual check of the detected problem. For example, the resource allocator 126 or monitor 130 may have problems communicating with a capacity card 129 due to an internal failure or slow response. The status field provides a visual means for the provider to determine whether the machine is operating properly.

The fields describe with reference to the Table and the screen 400 FIG. 4, are merely illustrative. Other embodiments may include more or less fields.

It is contemplated that the signature 402 maybe generated using only a portion of the billing information shown in the Table above. In one embodiment, only those fields indicated with an asterisk are used for generating the signature. In general, the fields used in generating the signature are selected to prevent, or at least substantially complicate, reverse engineering efforts. In addition, a number of the fields are needed to produce a meaningful invoice. It should be understood, however, that the indicated fields of the Table are merely illustrative, and persons skilled in the art will recognize other combinations of fields (whether or not shown in the Table) which may be used to generate the signature 402.

In any case, and regardless of the particular transmission medium, the billing information 142 maybe provided to the provider computer 102 for the generation of an invoice 144. In one embodiment, the provider computer 102 is configured with a billing algorithm 146 capable of generating the invoice 144 based on the billing information 142. In order to ensure authenticity of the billing information 142, the billing algorithm 144 may include a signature verification function 148. The signature verification function 148 is configured to verify the signature generated by the signature generator 136 and included with the billing information (e.g., the signature 402 shown in the screen 400 of FIG. 4). As such, the particular algorithm used by the signature verification function 146 will depend upon the encryption algorithm used by the signature generator 136, and the invention is not limited to any particular algorithm for this purpose.

In one embodiment, the signature verification function 148 takes selected fields from the billing information provided by the customer and calculates a signature. If the provider-generated signature (generated by the signature verification function 148) matches the customer-generated signature 402 (generated by the signature generator 136) then the signature 402 is considered authentic/verified. Therefore, it is clear that the data used by signature verification function 148 to generate a signature must be the same as the data used by the signature generator 136 to generate the signature 402. Where the billing information (i.e., the displayed information of the screen 400) is sent to a provider as a hardcopy (e.g., via facsimile or mail), the information may be input manually to the provider computer by a user. However, the displayed information of the screen 400 may be a representation of a different data format actually used to generate the signature 402 by the signature generator 136. For example, it is well known that the displayed time stamp 404 and the date stamp 406 may be generated (e.g., by the operating system of the customer computer) from a raw machine instructions format (i.e., a hexadecimal format). Thus, the raw machine instructions format may be used to generate the signature 402 on the customer computer, in which case the raw machine instructions format must also be used to generate the signature on the provider computer by the signature verification function 148. To this end, the provider computer converts the displayed time stamp 404 and the date stamp 406 values back to raw data and then the signature verification function 148 calculates a signature based on the raw data, as well as other selected fields of the billing information. Alternatively, the raw format may be included as a displayed field of the screen 400. In this case, the raw format is input to the provider computer and provided to the signature verification function 148 without the need for any conversion.

In one embodiment, the level of granularity of the raw machine instructions format on the customer computer is finer than that of the displayed values. That is, the raw machine instructions format may have a granularity on the level of microseconds, while the displayed time stamp 404 may have granularity on the level of seconds. In order to successfully verify the signature 402, both the signature generator 136 and the signature verification function 148 must be use time/date data of the same granularity to ensure that the resulting signatures (customer and provider) are generated over the same data. That is, the data must be normalized on the customer computer and the provider computer. For example, lower bits in the raw machine instruction format (lower bits representing finer granularity) may be truncated or set to zero when generating the signature on both the customer computer and the provider computer.

In addition (or alternatively) to the signature generated by the signature generator 136, other aspects of information provided by the client computer 104 may be used to validate the authenticity of the billing information 142. For example, the System Runtime Counter (described above with reference to the Table) is expected to increase over time. A decreasing or static value between billing cycles is indicative of information tampering. To this end, the provider computer 102 may include a billing history database 150 containing billing information from previous billing cycles. The billing history database 150 may be accessed when processing current billing information for a customer.

Operation

Referring now to FIG. 5, a flow chart is shown illustrating various aspects of operation. In general, the FIG. 5 shows operations performed by provider 502 and a customer 504. In one embodiment, the provider 502 may implement its operations using the provider computer 102 and the customer 504 may implement its operations using the client computer 102, both of which are shown in FIG. 1 and described above. Accordingly, reference will be made to certain aspects of FIG. 1, where appropriate.

In one embodiment, a resource enablement service operation is initiated by a customer request (step 506) for an enablement code. In response to the request, the provider 502 generates an enablement code (step 508) and then sends the enablement code to the customer 504 (step 510). For recordkeeping purposes, the provider 502 may store the enablement code to a database 512, which may be the same database 150 in which billing information is stored (described above with respect to FIG. 1).

Upon receipt of the enablement code (step 514) the customer inputs the code to the capacity manager 120 (step 516). As noted above, inputting the enablement code may be done using the user interface 118. However, is also contemplated that the enablement code may be input to the capacity manager 120 directly by the provider 502 via a communications link (e.g., and network connection). In another embodiment, the enablement code is input by an application or other program or routine. In any case, the capacity manager 120 then determines whether the enablement code is valid (step 518). If the code is invalid, the capacity manager 120 rejects the code (step 520). If the enablement code is valid, the resources specified in the resource identification component of the enablement code are enabled (step 522).

At any time after the selected resources are enabled, a resource request 524 may be received by the capacity manager 120 (step 526). The resource request 524 may be issued by a user via the user interface 118. Alternatively, the resource request 524 may be issued by some other resource of a given system. For example, a software program may determine the need for additional processing power in order to perform a function. If additional enabled processors are standing by, the software program may request the use of these processors.

Regardless of its source, the resource request 524 may specify a quantity of resources to be used and a period of time during which the specified quantity of resources will be used. The resource request 524 may specify all, or a portion of, the enabled resources so long as the usage limit defined by the resource-time value 116 is not exceeded, as described above.

In any case, for a given request, the specified quantity of resources are placed into service for the specified time period (step 528). The capacity manager 120 (and more specifically, the monitor 130) then monitors the usage of the requested resources (step 530). Information pertaining to the usage may be logged in a database 532 (which may include the log 132 described above with reference to FIG. 1) and within the capacity card 129 (also shown in FIG. 1) for non-volatility and security reasons. When the requested time period for the selected resources expires (as determined at step 534), or when the request for the resources is canceled, the resources are reclaimed (step 536).

The reclamation process at step 536 may vary depending upon policies set for the operating system, for example. In some cases, such as where the resources have been configured into a secondary partition in a logically partitioned environment, it may be undesirable to reclaim the resources. In this case, the resources may be marked as "Unreturned" and their continued usage is tracked and billed to the customer. Subsequent attempts to reclaim the resources may then be made periodically. If the operating system is to allow the removal of resources from a running (functional) partition, then the steps taken by the system to reclaim the resource are substantially the opposite of the allocation process. As an example, consider a system needing to reclaim a processor from a partition. If the partition has more than one processor assigned to it, a work scheduler function may attempt to reassign jobs that are running, or are queued up to run, on the processor to be reclaimed to other processors assigned to the partition. The processor may then be reclaimed by changing its state to "inactive".

From time to time, billing information is gathered for purposes of examination and/or invoicing. The request for the billing information may be initiated by the provider 502 (as represented by the request 540) or customer 504 (as represented by the request 542). In either case, the billing information is gathered (step 544), e.g., by the billing information generator 134. A signature is then generated based on the billing information (step 546). The collective information (i.e., the billing information and the signature, which may be considered part of the billing information) is then provided to the requester (step 548). If the requester is the provider 502, the provider 502 receives the billing information (step 550) and then determines whether the billing information is authentic (step 552). If the billing information cannot be authenticated, the provider 502 may notify the customer (step 554). In one embodiment, the customer may have customer personnel access the customer system to verify the billing information. If, on the other hand, the billing information is authenticated, an invoice 144 is generated (step 556) and provided to the customer 502.

While the foregoing is directed to embodiments of the present invention, other and further embodiments of the invention may be devised without departing from the basic scope thereof, and the scope thereof is determined by the claims that follow.

What is claimed is:

1. A computer-implemented method for enabling resources on a computerized apparatus, comprising:
    receiving a resource-time value comprising:
        a resource-identifying component specifying a resource that is capable of being selectively enabled for use, wherein the resource includes at least one hardware resource of the computerized apparatus, the hardware resource being a hardware device selected from a memory, a processor and a storage device;
        a resource-quantity component specifying a first quantity of the resource, wherein the first quantity is a fraction of the resource; and
        a time component specifying a time period for which the resource is enabled;
    enabling the quantity of the resource, wherein the resource is included in one of two or more logical partitions of hardware devices in the computerized apparatus, wherein the enabling comprises determining, based on at least the first quantity, a second quantity, the second quantity representing one of a number of processor clock cycles, a quantity of memory capacity, and a quantity of storage of the at least one hardware device included in the resource;
    wherein the enabled quantity of the resource further comprises unlocking the quantity of the resource and making it available for use upon request;
    wherein placing the specified quantity of the enabled resource into service for the specified time period is done in response to a user request specifying the specified quantity and the specified time period;
    storing usage information associated with the enabled quantity of the resource during operation of the computerized apparatus;
    determining the expiration of the time period;
    disabling the enabled quantity of the resource upon determining the expiration of the time period; and
    generating an invoice based on the usage information, wherein the invoice includes a digital signature based on at least a portion of the usage information.

2. The computer-implemented method of claim 1 wherein enabling comprises inputting the resource-time value into the computerized apparatus.

3. The computer-implemented method of claim 1 wherein enabling comprises inputting the resource-time value into the computerized apparatus via a user interface.

4. The computer-implemented method of claim 1 further comprising validating the resource-time value.

5. The computer-implemented method of claim 1 wherein resource-time value is a machine-specific code unique to the computerized apparatus.

6. The computer-implemented method of claim 1 wherein a mathematical product of the quantity and the time period must be less than or equal to a maximum allowable usage value.

7. The computer-implemented method of claim 1 wherein the resource is a processor and the time period is a number of days.

8. The computer-implemented method of claim 1 wherein enabling comprises making the quantity of the resource available to be placed into use, the method further comprising placing at least a portion of the enabled quantity of the resource into service for a specified time period.

9. A computer-implemented method for enabling resources on a computerized apparatus, comprising:
    receiving a resource-time value comprising:
        a resource-identifying component specifying a resource that is capable of being selectively enabled for use, wherein the resource includes at least one hardware resource of the computerized apparatus, the hardware resource being a hardware device selected from a memory, a processor and a storage device;
        a resource-quantity component specifying a first quantity of the resource, wherein the first quantity is a fraction of the resource; and
        a time component specifying a time period for which the resource is enabled;
    enabling the quantity of the resource, wherein the resource is included in one of two or more logical partitions of hardware devices in the computerized apparatus, wherein the enabling comprises determining, based on at least the first quantity, a second quantity, the second quantity representing one of a number of processor clock cycles, a quantity of memory capacity, and a quantity of storage of the at least one hardware device included in the resource;
    wherein the enabled quantity of the resource further comprises unlocking the quantity of the resource and making it available for use upon request;
    storing usage information associated with the enabled quantity of the resource during operation of the computerized apparatus;
    placing the specified quantity of the enabled resource into service for the specified time period, wherein the product of the quantity value and the time period value must be less than or equal to a maximum allowable usage value;
    wherein placing the specified quantity of the enabled resource into service for the specified time period is done in response to a user request specifying the specified quantity and the specified time period;
    disabling the enabled quantity of the enabled resource upon expiration of the time period; and generating an invoice based on the usage information, wherein the invoice includes a digital signature based on at least a portion of the usage information.

10. A computer-implemented method for providing resource-enabling values, comprising:
  generating a resource-time value comprising:
    a resource-identifying component specifying a resource that is capable of being selectively enabled for use, wherein the resource includes at least one hardware resource of the computerized apparatus, the hardware resource being a hardware device selected from a memory, a processor and a storage device;
    a resource-quantity component specifying a first quantity of the resource, wherein the first quantity is a fraction of the resource; and
    a time component specifying a time period for which the resource is enabled;
  wherein the resource-time value is configured to:
  enable, on the computerized apparatus, the quantity of the resource, wherein the resource wherein the enabling comprises determining, based on at least the first quantity, a second quantity, the second quantity representing one of a number of processor clock cycles, a quantity of memory capacity, and a quantity of storage of the at least one hardware device included in the resource;
  wherein the enabled quantity of the resource further comprises unlocking the quantity of the resource and making it available for use upon request;
  wherein placing the specified quantity of the enabled resource into service for the specified time period is done in response to a user request specifying the specified quantity and the specified time period;
  the enabled quantity of the resource being disabled after determining the expiration of the time period;
  store, on the computerized apparatus, usage information associated with the enabled quantity of the resource during operation of the computerized apparatus;
  determine, on the computerized apparatus, the expiration of the time period;
  disable, on the computerized apparatus, the enabled quantity of the resource upon determining the expiration of the time period; and
  generate, on the computerized apparatus, an invoice based on the usage information, wherein the invoice includes a digital signature based on at least a portion of the usage information.

11. The computer-implemented method of claim 10 wherein generating the resource-time value comprises encrypting the resource-time value.

12. The computer-implemented method of claim 10 wherein the resource-time value is a machine-specific code unique to the computerized apparatus.

13. The computer-implemented method of claim 10 wherein the time period is a number of days.

14. A non-transitory computer readable medium containing a program which, when executed, performs an operation, comprising:
  receiving a resource-time value comprising:
    a resource-identifying component specifying a resource that is capable of being selectively enabled for use, wherein the resource includes at least one hardware resource of a computerized apparatus, the hardware resource being a hardware device selected from a memory, a processor and a storage device;
    a resource-quantity component specifying a first quantity of the resource, wherein the resource-quantity component is a fraction of the resource; and
    a time component specifying a time period for which the resource is enabled;
  enabling the quantity of the resource, wherein the resource is included in one of two or more logical partitions of hardware devices in the computerized apparatus, wherein the enabling comprises determining, based on at least the first quantity, a second quantity, the second quantity representing one of a number of processor clock cycles, a quantity of memory capacity, and a quantity of storage of the at least one hardware device included in the resource;
  wherein the enabled quantity of the resource further comprises unlocking the quantity of the resource and making it available for use upon request;
  wherein placing the specified quantity of the enabled resource into service for the specified time period is done in response to a user request specifying the specified quantity and the specified time period;
  storing usage information associated with the enabled quantity of the resource during operation of the computerized apparatus;
  determining the expiration of the time period;
  disabling the enabled quantity of the resource upon determining the expiration of the time period; and
  generating an invoice based on the usage information, wherein the invoice includes a digital signature based on at least a portion of the usage information.

15. The non-transitory computer readable medium of claim 14, wherein enabling comprises unlocking the quantity of the resource and making it available for use upon request.

16. The non-transitory computer readable medium of claim 14, the operation further comprising processing a request to use at least a portion of the enabled quantity of the resource during operation of the apparatus.

17. The non-transitory computer readable medium of claim 16, the operation further comprising placing the portion of the enabled quantity of the resource into service, whereby the portion of the enabled quantity of the resource is used by an operating system during operation of the apparatus.

18. The non-transitory computer readable medium of claim 14, wherein the product of the quantity and the time period must be less than or equal to a maximum allowable usage value.

19. The non-transitory computer readable medium of claim 14, wherein the resource-time value is a machine-specific code unique to the computerized apparatus, and further comprising validating the resource-time value.

20. A computerized apparatus, comprising:
  a plurality of resources including hardware and software; and
  a capacity manager configured to at least:
  receive a resource-time value comprising:
    a resource-identifying component specifying a resource that is capable of being selectively enabled for use, wherein the resource includes at least one hardware resource of the computerized apparatus, the hardware resource being a hardware device selected from a memory, a processor and a storage device;
    a resource-quantity component specifying a first quantity of the resource, wherein the first quantity is a fraction of the resource; and
    a time component specifying a time period for which the resource is enabled;
  enable the quantity of the resource, wherein the resource is included in one of two or more logical partitions of hardware devices in the computerized apparatus, wherein the enabling comprises determining, based on at least the first quantity, a second quantity, the second quantity representing one of a number of processor clock cycles, a quantity of memory capacity, and a quantity of storage of the at least one hardware device included in the resource;

wherein the enabled quantity of the resource further comprises unlocking the quantity of the resource and making it available for use upon request;

store usage information associated with the enabled quantity of the resource during operation of the computerized apparatus;

place the specified quantity of the enabled resource into service for the specified time period, wherein the product of the quantity value and the time period value must be less than or equal to a maximum allowable usage value;

wherein placing the specified quantity of the enabled resource into service for the specified time period is done in response to a user request specifying the specified quantity and the specified time period;

disable the enabled quantity of the enabled resource upon expiration of the time period; and generate an invoice based on the usage information, wherein the invoice includes a digital signature based on at least a portion of the usage information.

21. A computer-implemented method for allowing enablement of resources on a computer, comprising:

generating an enablement code configured to enable the resources on the computer and make resources selectively available for use for a limited period of time upon request, wherein the enablement code comprises:

a resource-identifying component specifying a resource that is capable of being selectively enabled for use, wherein the resource includes at least one hardware resource of the computerized apparatus, the hardware resource being a hardware device selected from a memory, a processor and a storage device;

a resource-quantity component specifying a first quantity of the resource, wherein the first quantity is a fraction of the resource; and a time component specifying a time period for which the resource is enabled, wherein the enablement code is configured to:

cause the quantity of the resource on the computer to be enabled, wherein the resource is included in one of two or more logical partitions of hardware devices in the computerized apparatus, and, wherein the enabling comprises determining, based on at least the first quantity, a second quantity, the second quantity representing one of a number of processor clock cycles, a quantity of memory capacity, and a quantity of storage of the at least one hardware device included in the resource;

wherein the enabled quantity of the resource further comprises unlocking the quantity of the resource and making it available for use upon request;

wherein placing the specified quantity of the enabled resource into service for the specified time period is done in response to a user request specifying the specified quantity and the specified time period;

cause the storage of usage information associated with the enabled quantity of the resource during operation of the computerized apparatus;

cause the enabled quantity of the resources to be disabled when the time period is decremented to zero;

cause the generation of an invoice based on the usage information, wherein the invoice includes a digital signature based on at least a portion of the usage information; and sending the enablement code to a user of the computer, wherein the resources are inaccessible to the user without the enablement code.

22. The method of claim 21, further comprising charging a fee for the enablement code.

* * * * *